Feb. 26, 1957 V. L. OTT 2,782,587
LAWN EDGER
Filed June 9, 1954 2 Sheets-Sheet 1
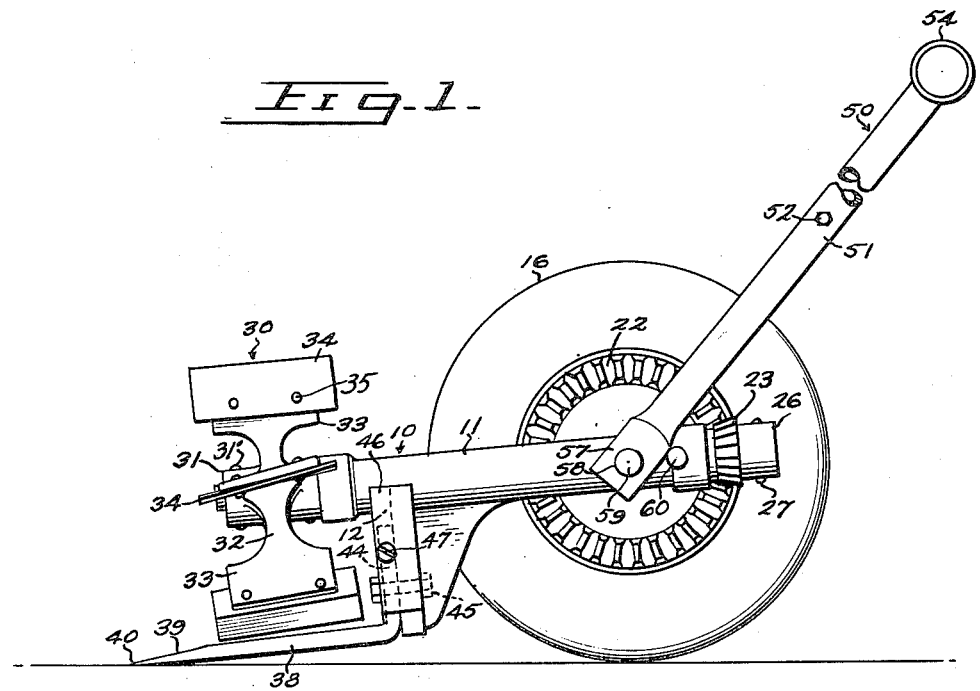
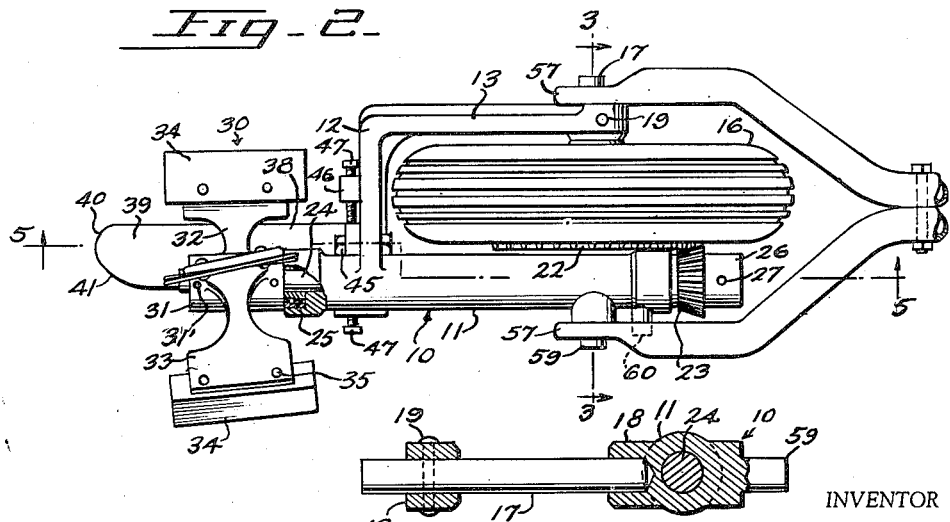
INVENTOR
VIVIAN L. OTT
BY
ATTORNEY Feb. 26, 1957  V. L. OTT  2,782,587
LAWN EDGER
Filed June 9, 1954  2 Sheets-Sheet 2
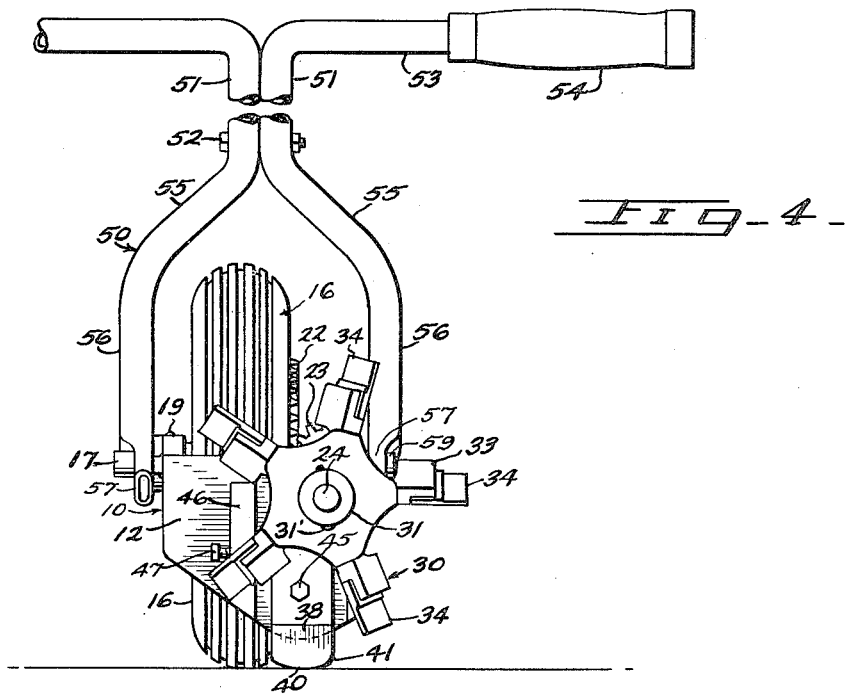
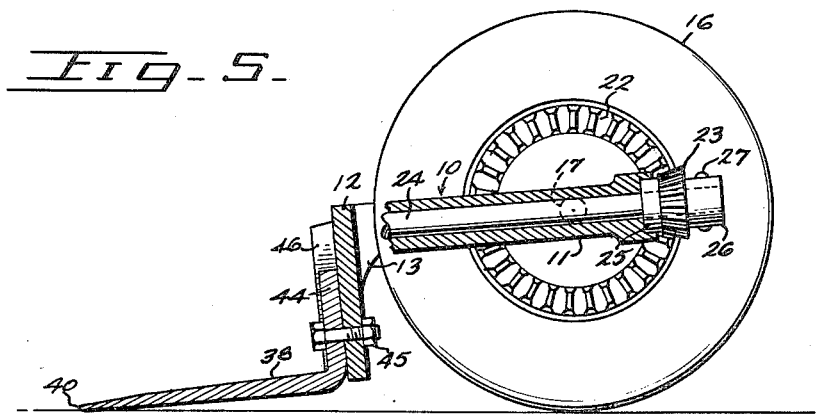
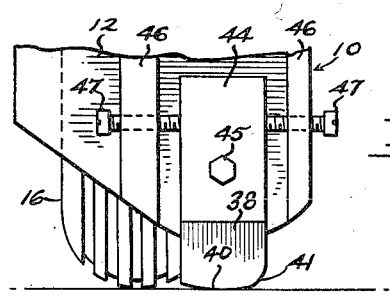
INVENTOR
VIVIAN L. OTT
BY John F. Phillips
ATTORNEY

United States Patent Office 2,782,587
Patented Feb. 26, 1957

2,782,587

LAWN EDGER

Vivian L. Ott, Norfolk, Va., assignor to Utility-Tools, Incorporated, Norfolk, Va., a corporation of Virginia Application June 9, 1954, Serial No. 435,419

1 Claim. (Cl. 56—249)

This invention relates to a lawn edger and is a continuation-in-part of my application Serial No. 354,479, filed May 12, 1953 now abandoned.

In my co-pending application referred to above I have shown a novel type of simplified lawn edger having a stationary blade or ledger bar projecting forwardly in the direction of movement of the apparatus and over which rotates a reel carrying cutting blades cooperating with the stationary blade sliding close to the edge of a concrete sidewalk or the like to clip the grass projecting above and overhanging the edge of the sidewalk. Such device provides a reel arranged with its axis parallel to the direction of movement of the device and driven from the ground wheel by a simplified gearing connection therewith.

An important object of the present invention is to even further simplify the structure of my co-pending application referred to to reduce the number of parts involved and thus reduce the cost of manufacture of the device.

A further object is to provide a novel simplified unitary frame which carries both the ground wheel and the shaft for the ground wheel, and also carries the stationary blade, all of the operating parts thus being supported in the simplest and most economical manner.

A further object is to provide such a device wherein the unitary frame readily may be formed as a casting having two parallel portions between which the ground wheel is arranged, and which arms are provided with integral lugs in which the shaft for the ground wheel is supported, a single and very simple securing means being employed for fixing the shaft in position with respect to the frame.

A further object is to provide such a device having novel means for supporting relative thereto the shaft for the ground wheel, and to utilize one end of said shaft and an integral lug carried by the frame arm at the opposite side of the device for supporting a handle structure relative to the device.

A further object is to provide means carried by the integral frame for supporting the stationary blade for adjustment in the simplest possible manner relative to the reel to permit adjustments of these parts to be made with the highest degree of facility and in the least possible time.

Other objects and advantages of the invention will become apparent during the course of the following description:

In the drawing I have shown one embodiment of the invention. In this showing

Figure 1 is a side elevation of the device, a portion of the handle structure being broken away, Figure 2 is a plan view of the same, Figure 3 is a detail sectional view on line 3—3 of Figure 2, the ground wheel and handle structure being omitted, Figure 4 is a front elevation of the device, portions of the handle structure being broken away, Figure 5 is a section taken substantially on line 5—5 of Figure 2, and Figure 6 is a fragmentary front elevation, the reel being omitted.

Referring to the drawing, the numeral 10 designates the main frame as a whole of the device which, as will become apparent, readily can be, and preferably is, formed as a unitary casting, for example, of gray iron. The frame 10 comprises a tubular body 11 at one side of the device, forming one arm of the frame. Preferably cast integral with such arm is a transverse body section 12 which carries a perferably integral rearwardly extending arm 13 forming the second side arm of the device, arranged parallel to the arm formed by the tube 11.

A ground or traction wheel 16 is arranged between the arm members 11 and 13 and preferably is rubber-tired as shown. This wheel is provided therewithin with suitable bearings (not shown) surrounding a stationary axle 17 on the axis of which the wheel 16 rotates. Referring to the detail showing in Figure 3, it will be noted that the frame arm 11 is provided with an integral lug 18 drilled to receive one end of the shaft 17. The other end of the shaft projects through and beyond the arm 13, as shown in Figure 2, for a purpose to be described. After the assembling of the parts in a manner to be described, a pin 19 is driven through the rear end of the arm 13 and preferably through a tangential groove (not shown) in the shaft 17 to anchor this shaft to the frame. This fastening element 19 is the only means required for fixing the shaft 17 to the frame.

The wheel 16 carries a bevel gear 22 meshing with a bevel pinion 23 secured to a shaft 24 projecting through the tubular side member 11. In the forward and rear ends of the tubular member 11 are arranged preferably combined radial and thrust bearings 25 (Figures 2 and 5). The bevel pinion 23 is provided with a hub 26 riveted as at 27 or otherwise secured to the rear end of the shaft 24.

The shaft 24 projects forwardly of the forward bearing 25 and has mounted thereon a reel indicated as a whole by the numeral 30. This reel comprises a hub 31 fixed to the shaft 24 by a pin or rivet 31' which may be of the same type as the fastening element 19. The hub 31 is engageable with the forward bearing 25 while the bevel pinion 23 is engageable with the rear bearing 25 (Figure 5) and accordingly, the end thrusts are taken up with these bearings while supoprting the shaft 24 for free rotation. The hub 30 carries outwardly projecting spider arms 32 having elongated plates 33 formed integral with the outer ends thereof and riveted as at 35 or otherwise secured to the rotary blades 34.

A preferably integral steel stationary blade or ledger bar 38 is arranged beneath the reel and projects forwardly thereof as at 39 and terminates at its forward end in a thin knife-like rounded end 40 slidable over the surface of a sidewalk to pick up overhanging grass and feed it rearwardly around an arcuate blade edge portion 41 to be cut by the rotary blades 34 operating over the stationary blade.

The stationary blade 38 has an integral upwardly extending rear end 44 (Figure 5) lying against the forward face of the transverse frame member 12. Such end of the stationary blade is secured to the transverse frame member 12 by a bolt 45. The transverse member 12 is provided with parallel integral ribs 46 (Figures 5 and 6) normally parallel to and spaced from the edges of the upturned blade end 44. Through each rib 46 is threaded a set screw 47, the inner ends of these set screws engaging opposite edges of the upturned end 44.

It will be noted that the cross frame member 12 is of substantial depth vertically, which accommodates the adjusting means for the stationary blade and provides a substantial degree of strength in the connecting member between the side frame members 11 and 13. Moreover, the integral ribs 46 serve to reinforce the cross member 12, thus providing it with additional strength.

A handle structure indicated as a whole by the numeral 50 is employed for pushing the device forwardly in its operation. The handle structure comprises a pair of tubular bars 51 having the portions intermediate their ends in parallel contacting relationship and fixed together by bolts 52. The upper end of each member 51 turns outwardly as at 53 to form a handle bar and each handle bar is preferably provided with a hand grip 54. Below the contacting portions thereof, the handle members 51 diverge as at 55 and have their lower ends extending downwardly parallel to each other as at 56. The lower extremities of the ends 56 are flattened as at 57 and are apertured as at 58 (Figure 1). One of these apertures receives a lug 59 integral with the side frame member 11 (Figure 3). The aperture in the lower extremity of the other handle member receives the end of the shaft 17 projecting beyond the frame member 13, the shaft 17 and lug 59 being in axial alignment. The frame member 11, rearwardly of the lug 59, is provided with a preferably integral stop lug 60 contactable with the adjacent handle end 56 to limit downwardly swinging movement of the handle structure.

Operation

The device readily may be transported from place to place by rolling the wheel 16 over the ground with the stationary blade 38 out of contact with the ground. When it is desired to use the device, it is placed in position with respect to the left-hand edge of a sidewalk with the wheel 16 resting on the sidewalk and with the forward end of the stationary blade sliding over the walk. The device is pushed forwardly, the operator holding the hand grips 54 to maintain the parts in proper position. In rolling over the walk, the wheel 16 will rotate in a counterclockwise direction as viewed in Figure 1 and the meshing of the gear 22 with the pinion 23 will rotate the reel 30 in a clockwise direction as viewed in Figure 4. Successive blades 34 accordingly will swing over in light contact with the stationary blade 38, and the blades 34 are tilted as shown to provide a clean shearing action.

The forward end 40 of the stationary blade picks up and feeds around the arcuate edge 41 all grass which overhangs the sidewalk, and accordingly all such grass will be fed to the reel to be trimmed. The forward end of the stationary blade also properly positions the parts so that it is merely necessary for the operator, in pushing the device forwardly, to maintain the forward end of the stationary blade in contact with the sidewalk. The grass picked up by the stationary blade will be swung outwardly to substantially vertical position to provide for the smooth uniform cutting of the grass. In practice, it has been found that a sidewalk or the like trimmed with the present device will be very neatly and uniformly trimmed, and very little manual effort is necessary in the pushing of the device over a sidewalk.

It has been the common practice heretofore to trim grass overhanging a walk by means of hand-operated shears or the like. The use of such expedient is laborious and does not result in a neat uniform trimming action. It has also been the common practice to chop out soil along the edge of a walk to assist in preventing grass from growing over the edge of the walk. This also is a laborious operation and is only a temporary expedient. The present device is quite small, light in weight and simple in construction and operation, and the trimming of grass along a walk may be done quite often without the expenditure of substantial labor and in an extremely short time. Accordingly, a neatly trimmed walk may be maintained at all times.

The device is made with a minimum number of simple parts, thus minimizing the cost of production and the sales price to the public. The shaft 17 may be made out of simple rod stock cut to lengths. In assembling the device, the wheel 16 is placed between the frame members 11 and 13, whereupon the shaft 17 is inserted through the frame member 13 and into the lug 18. The pin or rivet 19 is then driven in position through a suitable opening in the shaft 17 or through a simple tangential groove milled in one side thereof.

After the shaft has been inserted and fixed in position, the two handle members 51 are assembled by placing the apertures 58 in the lower ends thereof respectively over the projecting end of the shaft 17 and the lug 59. The handle members are then bolted together as at 52.

The shaft 24 is mounted in the bearings 25 which act effectively as both radial and thrust bearings, thus effectively taking up all loads to which the shaft 24 is subjected.

Occasional adjustment of the stationary blade 38 may be accomplished very easily in a matter of seconds through the medium of the accessible screws 47 (Figure 6). It is unnecessary to loosen the bolt 45. The operator will merely slightly loosen one screw 47 and then tighten the other screw 47 to accomplish the desired adjustment. The bolt 45 forms the sole means for securing to the frame 10 the simple integral stationary blade member.

The form of the invention described is intended only to be illustrative, the scope of the invention being defined in the appended claim.

I claim:

A lawn edger comprising an integral cast frame having parallel side members and a forward transverse frame member connected between said side members, an axle of uniform circular cross-sectional shape from end to end extending between said side frame members, a wheel mounted on said axle between said side frame members, one of said side frame members having an inwardly extending lug provided with a cylindrical recess lug slidably receiving the adjacent end of said axle, a lug carried by the other side frame member and having a cylindrical opening slidably receiving said axle and through and beyond which said axle extends, a single pin passing through said other side frame member and through said axle, said one side frame member being formed as a single tube from end to end constituting the entire frame member, a shaft mounted in said tube and having its ends extending therebeyond, a bearing in the rear end of said tube, a pinion carried by the rear end of said shaft and abutting said bearing, a gear carried by said wheel and meshing with said pinion rearwardly of said axle, a rotary cutting device carried by the forward end of said shaft, and a stationary blade carried by said transverse frame member and projecting forwardly beneath and cooperating with said rotary cutting device, said stationary blade having its forward end projecting forwardly beyond said rotary cutting device and constituting a relatively thin pick-up finger.

References Cited in the file of this patent

UNITED STATES PATENTS

| | | |
|---|---|---|
| 897,436 | Watkins | Sept. 1, 1908 |
| 2,093,413 | Brosted | Sept. 21, 1937 |
| 2,220,552 | Slack | Nov. 5, 1940 |
| 2,608,044 | McAuliffe | Aug. 26, 1952 |